United States Patent
Endoh et al.

(10) Patent No.: US 6,975,578 B2
(45) Date of Patent: Dec. 13, 2005

(54) OPTICAL RECORDING MEDIUM WITH GROOVES, OPTICAL RECORDING MEDIUM MASTER WITH GROOVES, APPARATUS FOR MANUFACTURING OPTICAL RECORDING MEDIUM MASTER WITH GROOVES, AND OPTICAL RECORDING/REPRODUCING APPARATUS

(75) Inventors: Sohmei Endoh, Miyagi (JP); Katsuhiko Ohtomo, Miyagi (JP); Ikuhiro Hideta, Miyagi (JP)

(73) Assignee: Sony Corporation, Tokyo (JP)

(*) Notice: Subject to any disclaimer, the term of this patent is extended or adjusted under 35 U.S.C. 154(b) by 8 days.

(21) Appl. No.: 10/250,684

(22) PCT Filed: Jan. 18, 2002

(86) PCT No.: PCT/JP02/00331

§ 371 (c)(1),
(2), (4) Date: Jan. 26, 2004

(87) PCT Pub. No.: WO02/058057

PCT Pub. Date: Jul. 25, 2002

(65) Prior Publication Data

US 2004/0114487 A1  Jun. 17, 2004

(30) Foreign Application Priority Data

Jan. 18, 2001 (JP) ............... 2001-009841

(51) Int. Cl.[7] .............................................. G11B 7/00
(52) U.S. Cl. ................................................ 369/275.4
(58) Field of Search .................. 369/275.4, 47.27, 369/53.34, 44.26, 44

(56) References Cited

U.S. PATENT DOCUMENTS

| | | | | |
|---|---|---|---|---|
| 4,416,002 A | * | 11/1983 | Oguino et al. | 369/44.27 |
| 5,757,756 A | * | 5/1998 | Hajjar | 369/275.1 |
| 5,844,882 A | * | 12/1998 | Yoshida et al. | 369/275.4 |
| 6,069,870 A | * | 5/2000 | Maeda et al. | 369/275.4 |
| 6,292,458 B1 | * | 9/2001 | Eguchi et al. | 369/275.3 |
| 6,538,968 B1 | * | 3/2003 | Yamaguchi et al. | 369/47.53 |
| 6,590,844 B2 | * | 7/2003 | Fujita et al. | 369/53.19 |
| 6,597,655 B2 | * | 7/2003 | Sato et al. | 369/275.4 |
| 6,611,492 B2 | | 8/2003 | Akimori et al. | |
| 6,621,772 B2 | * | 9/2003 | Asano et al. | 369/44.26 |
| 6,795,390 B2 | * | 9/2004 | Miyamoto et al. | 369/275.4 |

FOREIGN PATENT DOCUMENTS

| EP | 838808 | 4/1998 |
|---|---|---|
| JP | 6-338066 | 12/1994 |
| JP | 2000-306242 | 11/2000 |

OTHER PUBLICATIONS

U.S. Appl. No. 09/849,278, filed May 7, 2001, Endoh.
U.S. Appl. No. 10/250,684, filed Jul. 17, 2003, Endoh et al.

* cited by examiner

Primary Examiner—Hoa T. Nguyen
Assistant Examiner—Kyung D. Kim
(74) Attorney, Agent, or Firm—Oblon, Spivak, McClelland, Maier & Neustadt, P.C.

(57) ABSTRACT

The stable reproduction of wobble signal without generating beats despite of an improvement in recording density by narrowing a track pitch is realized. Data by magnetooptical recording is recorded on wobbling grooves and lands between adjacent wobbling grooves. The wobbling grooves are provided to wobble both sides of the grooves in different amplitudes. Further, both the sides wobbled in different amplitudes are wobbled in phase in the track direction. These different amplitudes of both sides are preferably set to 3.3 to 40%.

12 Claims, 6 Drawing Sheets

| GROOVE WIDTH (nm) | JITTER IN LAND (%) | JITTER IN GROOVE (%) |
|---|---|---|
| 562 | 10.5 | 9.5 |
| 622 | 9.5 | 8.5 |
| 682 | 10.0 | 8.5 |

FIG. 6

OPTICAL RECORDING MEDIUM WITH GROOVES, OPTICAL RECORDING MEDIUM MASTER WITH GROOVES, APPARATUS FOR MANUFACTURING OPTICAL RECORDING MEDIUM MASTER WITH GROOVES, AND OPTICAL RECORDING/REPRODUCING APPARATUS

TECHNICAL FIELD

The present invention relates to an optical recording medium, an optical recording medium master, an apparatus for manufacturing optical recording medium master and an optical recording/reproducing apparatus.

BACKGROUND ART

An optical recording medium allows recording various signalized information to optically reproduce. There are various kinds of recoding type such as: read-only type optical discs in which embossed pits corresponding to data are preformed on a disc substrate, such as compact discs and laser discs; magneto optical discs on/from which data is recorded and reproduced utilizing a magnetooptical effect, such as Mini Discs (MD); and phase-change optical discs on/from which information (data) is recorded and reproduced utilizing phase change of a recording layer, such as Digital Versatile Discs (DVD).

In the optical recording medium capable of rewriting information, such as magneto optical discs and phase-change optical discs, contiguous grooves instead of discrete pits are formed along a recording track. The grooves are provided for mainly controlling tracking servo, so-called guide grooves. The interspaces between the grooves are called lands because they protrude in the position close to the surface of the grooves than the bottom thereof.

The optical recording medium formed with the grooves generally performs a tracking servo control by using a push-pull signal. In order to obtain the push-pull signal, a light beam is irradiated toward the optical recording medium and the light reflected by the optical recording medium is detected with two photodetectors placed symmetrical to the center of the track, thereby the push-pull signal can be obtained based on a difference in the outputs from two photodetectors.

The applicant has proposed a method of forming wobbling wide grooves, which is a data recording area of MD, by superimposing the signals of 22.05 kHz and 5 MHz in Japanese Patent No. 2960018. In this method, FM modulation signal of 22.05 kHz is for recording wobble information of address, whereas the signal of 5 MHz is for widening the groove width in accordance with the amplitude. With this method, the wobbling wide grooves are formed to wobble both sides of the grooves. The data recording area becomes wide grooves by forming the wobbling wide grooves in the optical recording medium. This achieves the stable reproduction of wobble signal of ADIP and the stable recording/reproducing of MO signal.

Japanese Patent No. 2854187 proposes the technique that one side of the grooves is wobbled and the other side is not wobbled but in straight (circular arc). According to the technique, address information can be stored in the wobbles of the grooves.

A high recording density and the stable reproduction of the wobble signal are required in the optical recording medium formed with the wobbling grooves.

However, in the optical recording medium in which one side of the grooves are wobbled as disclosed in Japanese Patent No. 2854187, the other side of the grooves which is not wobbled is not used for storing the address information. As a result, the wobble signal amount is about half of the optical recording medium in which both sides of the grooves are wobbled, thereby resulting in a problem of the difficulty of the stable reproduction of the wobble signal.

In addition, the stable reproduction of the wobble signal is desired by increasing the wobble signal amount. However, in order to form the grooves in which both sides thereof are wobbled and to improve the recording density, it is necessary to narrow a track pitch. The narrow track pitch generates beats in the wobble signal between the neighboring wobbles specifically in case of an out-of-phase wobble. This results in the problem of the difficulty of the stable reproduction of the wobble signal.

The present invention has been achieved in view of the above problems. It is an object of the invention to provide an optical recording medium capable of stably reproducing the wobble signal without generating beats even if the track pitch is narrowed to improve the recording density. Further, the present invention provides an optical recording/reproducing apparatus used for recording/reproducing on/from the optical recording medium, an optical recording medium master used for replicating the optical recording medium and an apparatus for manufacturing optical recording medium master.

DISCLOSURE OF THE INVENTION

The optical recording medium and the optical recording medium master of the invention have grooves on a surface of a substrate to constitute a groove track and are able to read information along a track of the grooves. The grooves are wobbling grooves provided to wobble both sides of the grooves in different amplitudes.

Another optical recording medium and the optical recording medium master of the invention have grooves on a surface of a substrate to constitute a groove track and are able to read information along a track of the grooves. The grooves are wobbling grooves provided to wobble both sides of the grooves in phase in different amplitudes.

A manufacturing apparatus for the optical recording medium master of the invention patterns grooves forming a track on a surface of a master, wherein a light beam for exposure or a laser beam is relatively traveled on a surface of a master of an optical recording medium with waving at a certain period in a direction intersect with a traveling based on a control signal superimposing a low-frequency signal and a high-frequency signal, and a latent image is formed to become wobbling grooves wobbles both sides of the grooves in phase in different amplitudes.

An optical recording/reproducing apparatus of the invention records and/or reproduces information on/from an optical recording medium having wobbling grooves provided to wobble both sides of grooves in different amplitudes and recording information both on the wobbling grooves and on lands, comprises: a means for traveling a light spot on the wobbling grooves; and a means for detecting a wobble signal by traveling the light spot on the wobbling grooves.

Another optical recording/reproducing apparatus of the invention records and/or reproduces information on/from an optical recording medium having wobbling grooves provided to wobble both sides of grooves in different amplitudes and recording information either on the wobbling grooves or on lands, comprises: a means for traveling a light spot on the wobbling grooves; and a means for detecting a wobble signal by traveling the light spot on the wobbling grooves.

In the optical recording medium, the master for the optical recording medium, the manufacturing apparatus of the master for the optical recording medium and the optical recording/reproducing apparatus of the invention, the grooves are wobbling grooves provided to wobble both sides of the grooves thereof in different amplitudes. Further, both sides wobble in different amplitudes are wobbled in phase in the track direction. These different amplitudes of both sides are preferably set to 3.3 to 40%.

Other and further objects, features and advantages of the invention will appear more fully from the following description.

BRIEF DESCRIPTION OF THE DRAWINGS

FIG. 6 shows the results of the measurement of jitter as a typical value of recoding/reproducing characteristic of the evaluation magneto optical disc.

BEST MODE FOR CARRYING OUT THE INVENTION

A preferred embodiment of the present invention will be described in more detail below referring to the accompanying drawings.

[Magneto Optical Disc]

Figure 1:
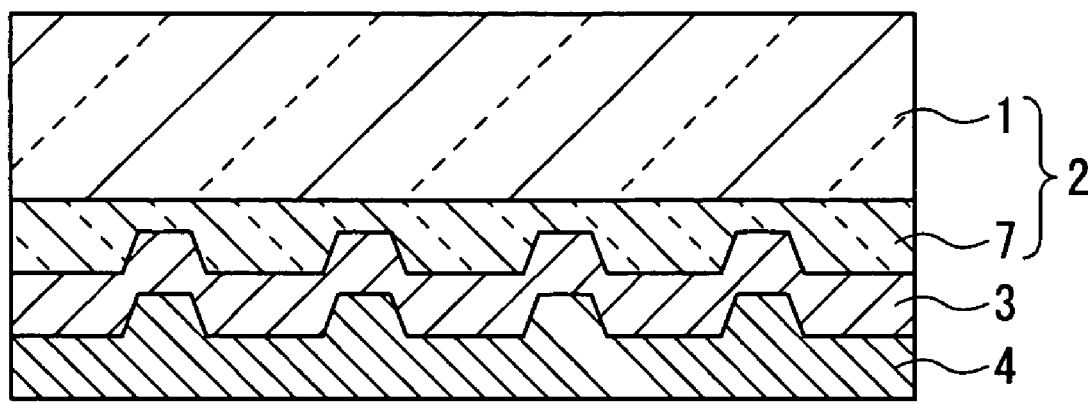
FIG. 1 shows a schematic structure of a magneto optical disc according to an embodiment of the invention.

FIG. 1 shows a schematic structure of a magneto optical disc of an embodiment of the invention. The magneto optical disc is a disc shaped optical recording medium recoding/reproducing data by the magnetooptical effect compliant with MD3 format standards.

A recoding area 3 recoding magnetooptically, a protective layer 4 covering the whole surface of the recording area for protection are laminated in this order on a disc substrate 2 made of glass, polymethylmethacrylate (PMMA) or polycarbonate (PC). Although not shown in FIG. 1, the recoding area 3 comprises, for example, a first dielectric film made of SiN (silicon nitride), a perpendicular recording film made of a TeFeCo alloy, a second dielectric film made of SiN, a reflective film made of an Al alloy or the like in this order. The protective layer 4 is formed on the recording area 3 by spin coating an ultraviolet curing resin. The materials for the recording area 3 and the protective layer 4 are not limited to the above. The materials capable of effective magnetooptical recording can be used for forming the recording area 3. Any kinds of materials which can effectively protect the recording area 3 can be used for forming the protective layer 4.

Figure 2:
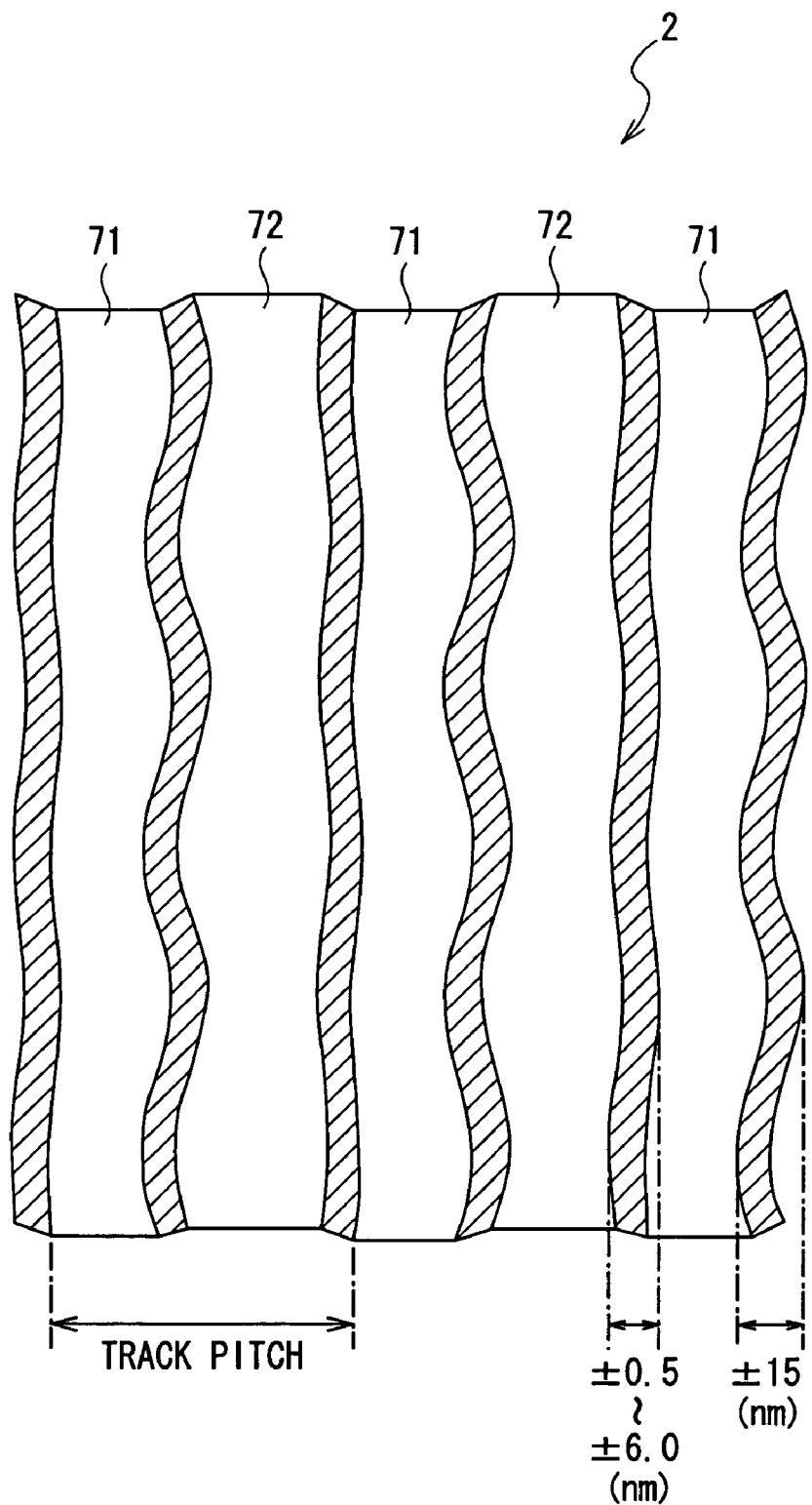
FIG. 2 is an enlarged view showing a recoding area formed on a surface of the magneto optical disc shown in FIG. 1.

FIG. 2 is an enlarged view of the recording area formed on a surface of the magneto optical disc. The recording area can write magnetooptical recoding data on wobbling grooves 71 and lands 72 formed between the adjacent wobbling grooves 71.

The wobbling grooves 71 have an amplitude of ±15 nm on one side (the right side in FIG. 2) and an amplitude any of ±0.5 nm, ±1.5 nm, ±3.0 nm or ±6.0 nm on the other side, for instance, and wobble at substantially constant period in phase in the longitudinal direction of the wobbling grooves 71. The track pitch is 1.2 μm and the widths of the substantial writing area of the wobbling grooves 71 and the lands 72 are about 0.60 μm. The track pitch is the distance between the centers of the wobbles of the neighboring tracks.

The magneto optical disc is a Land and Groove Format in which the average widths of the wobbling grooves 71 and the lands 72 are approximately equal. Therefore, enough level of push-pull signal can be obtained to perform the tracking servo control. The push-pull signal can be obtained based on a difference between output SA and output SB (SA−SB). The outputs SA and SB can be determined by detecting the reflected light obtained by irradiating a light beam toward the magneto optical disc with two photodetectors A and B (not shown) placed symmetrical to the center of the track. The amount of reflective light can be determined by the sum of the output SA from the photodetector A and the output SB from the photodetector B (SA+SB). The detected information of the amount of reflective light (the sum signal of SA+SB) is used for detecting the number of straddle of the tracks when a light beam spot travels across the wobbling grooves 71 in the width direction thereof. This is generally called a cross track signal.

As described, the wobbling grooves 71 are provided to wobble both sides in phase in different amplitudes and the address information is stored (added or included) in the wobbling grooves 71. As a result, compared to the case where the wobbling grooves 71 are provided to wobble one side thereof, the wobble signal amount is increased by 3.3% to 40%. Moreover, the wobbles on both sides are in phase and the amplitude of one side of the wobbling grooves 71 is ±15 nm and the other side is ±6.0 nm at the maximum, so when both sides of the wobbling grooves 71 are wobbled, sufficient signal amount can be obtained. In addition, the beats generated in the wobble signal during the recording/reproducing information can be reduced or eliminated, thereby the stable recording/reproducing is achieved.

Furthermore, enough push-pull signal for the tracking servo control can be obtained from both wobbles of the wobbling grooves 71 having different amplitudes. This enables to perform the sure tracking stably.

[Laser Cutting Apparatus and Fabrication of Master using the Same]

Figure 3:
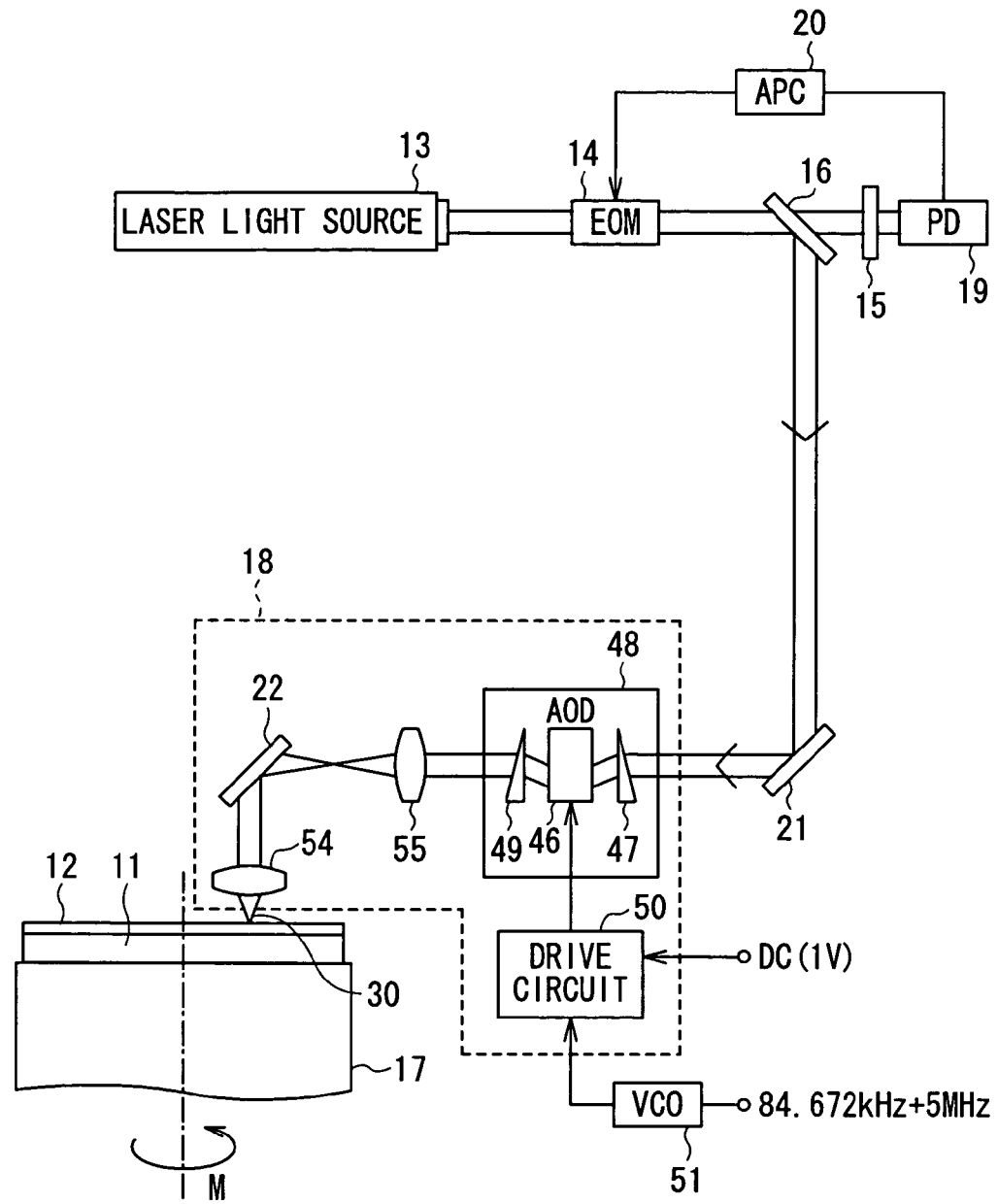
FIG. 3 shows a schematic structure of a laser cutting apparatus for producing a master for the magneto optical disc of an embodiment of the invention.

A master (a master for manufacturing the optical recording medium) is used for manufacturing the magneto optical disc by, for example, an injection molding apparatus. The master is manufactured by the laser cutting apparatus shown in FIG. 3.

The laser cutting apparatus exposes a photoresist 12 applied on a glass substrate 11 and forms a latent image of the planar pattern such as the wobbling grooves 71.

In the manufacturing process of the master, first, the glass substrate 11 applied with the photoresist 12 thereon is set on a turntable 17 of a rotative driving device (not shown). In the exposure process of the photoresist 12, the glass substrate 11 with the photoresist 12 is rotative driven by the turntable 17 as indicated by an arrow M in the figure. Moving optical table 18 irradiates a laser beam 30 on the photoresist 12 while moving in parallel. Thereby, a desired pattern is exposed on the whole photoresist 12 on the glass substrate 11.

Specifically, the relative rotational speed (linear speed) of the master by the turntable 17 to the laser beam 30 during the exposure is 0.91 m/s and the moving optical table 18 moves in parallel by the track pitch of 1.20 μm per rotation, for instance. The rotational speed and the absolute value of the track pitch are not limited to this.

More specifically, as a laser light source system, a laser light source 13 emitting laser light, an EOM (Electro Optical Modulator) 14 for adjusting the intensity of the laser light emitted from the laser light source 13, a BS (Beam Splitter) 16 for dividing the laser light emitted form the EOM 14 into transmitted light and reflective light, an analyzer 15 placed on the light axis of the laser light emitted from the EOM 14, a PD (Photo Detector) 19 receiving the laser light pass through the analyzer 15 and APC (Auto Power Controller) 20 for feedback controlling of the intensity of the laser light emitted from the EOM 14 with applying the signal electric field to the EOM 14 are comprised.

Kr (krypton) laser having a wavelength λ of 351 nm or the like, which can emit short wavelength laser light, is desirable as the laser light source 13, although this is not limited.

The laser light emitted form the laser light source 13 are adjusted to a predetermined light intensity by EOM 14 which is controlled and driven by the APC 20 and enters the analyzer 15. Here, the analyzer 15 is S polarized light, so the laser light pass through the analyzer 15 becomes S polarized light.

The laser light which is emitted from the laser light source 13 and travels straight via the EOM 14, the BS 16 and the analyzer 15 is received by the PD 19. The PD 19 detects the light intensity and sends the signal storing information of the light intensity to the APC 20. Upon receiving the signal, the APC 20 adjust the signal electric field by entering the control signal to the EOM 14 to uniform the laser light intensity received by the PD 19. The automatic control of the light amount of the laser light source system keeps the constant intensity of the laser light emitted from the EOM 14.

On the other hand, the laser light reflected by the BS 16 travels as a parallel beam is reflected by a mirror 21 to change the direction and conducted to an AOD (Acoustic Optical Deflector) 48 in the moving optical table 18.

The moving optical table 18 comprises the AOD 48, a drive circuit 50, a reflective mirror 22, a beam magnifying lens 55 and an objective lens 54. The AOD 48 comprises an acoustic optical element 46 and wedge prisms 47 and 49 placed front and the back of the light axis of the acoustic optical device 46. These are placed to make the lattice plane of the acoustic optical element 46 and the wedge prisms 47 and 49 satisfy the Bragg's condition of diffraction and not to change the horizontal height of the light axis. As the acoustic optical element 46, tellurium oxide ($TeO_2$) can be preferably used. The AOD 48 is controlled based on the DC signal from the drive circuit 50 to modulate the laser light intensity.

A voltage frequency controller 51 provides a high-frequency signal to the drive circuit 50. The control signal is externally provided to the voltage frequency controller 51. The control signal has a waveform in which a sinusoidal wave signal having a frequency of 5 MHz is superimposed on a sinusoidal wave signal having a frequency of 84.672 kHz. The sinusoidal wave of a frequency of 84.672 kHz wobbles the planer pattern of the wobbling grooves 71, while the amplitude of the sinusoidal wave of a frequency of 5 MHz widen the groove width of the planer pattern of the wobbling grooves 71.

The control signal controls the AOD 48 to change the Bragg diffraction angle of the acoustic optical element 46 in the AOD 48. This generates the wobbles storing the address information in the laser beam 30. At this time, the laser beam 30 is controlled to have a constant spot and converged on the master.

More specifically, in order to widen the width of the wobbling grooves 71, a spatial frequency of polarization frequency is adjusted and made multiple exposures to become smaller amplitude than a radius of laser beam 30 irradiating on the master. In other words, assuming the linear speed of the laser beam 30 relatively traveling on the master is v, the polarization frequency is f, a diameter of the laser beam is D, $v/f \leq D$. For example, when v=0.91 m/s, D=0.35 μm and f is 2.6 MHz or more ($f \geq 2.6$ MHz), the width of the wobbling grooves 71 can be widened.

Figure 4:
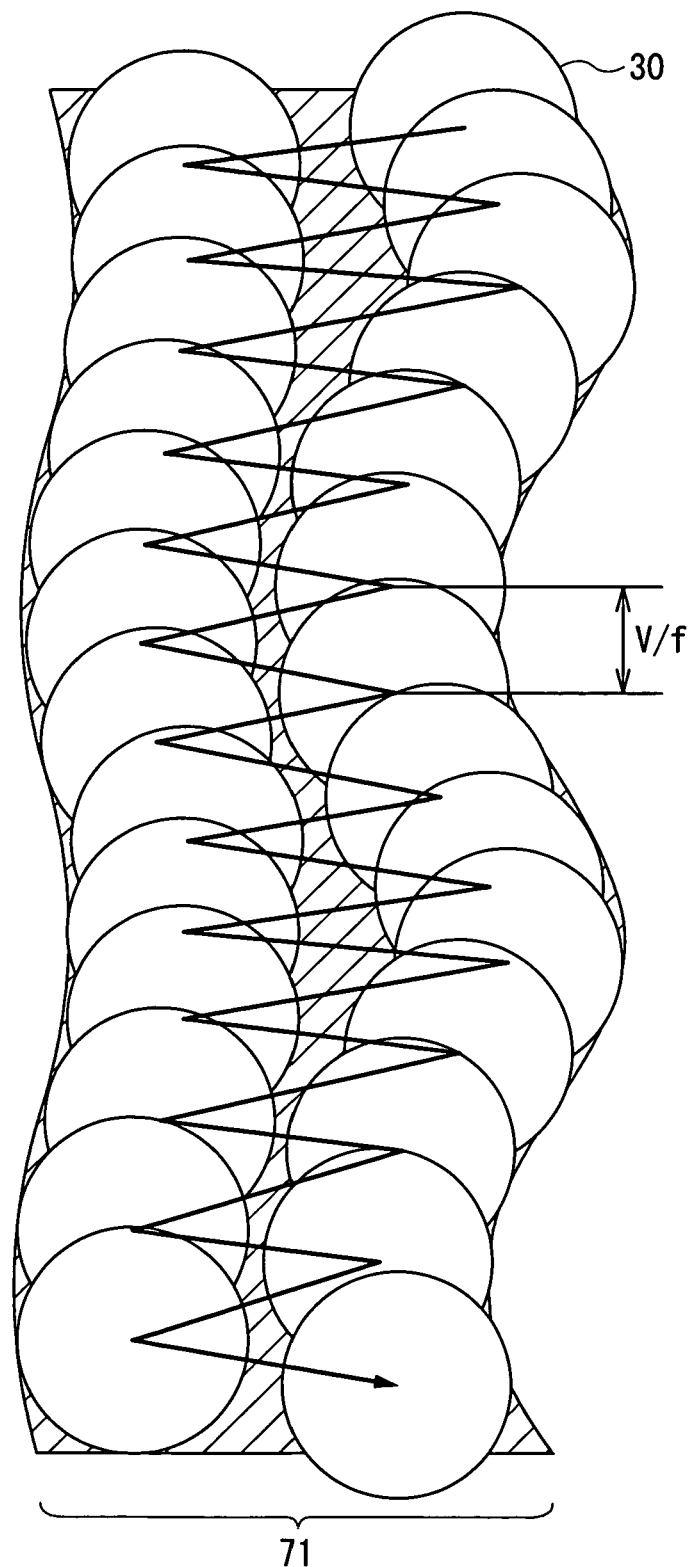
FIG. 4 schematically shows an exposure method for forming the wobbles having different amplitudes on both sides of wobbling grooves in phase.
Figure 5:
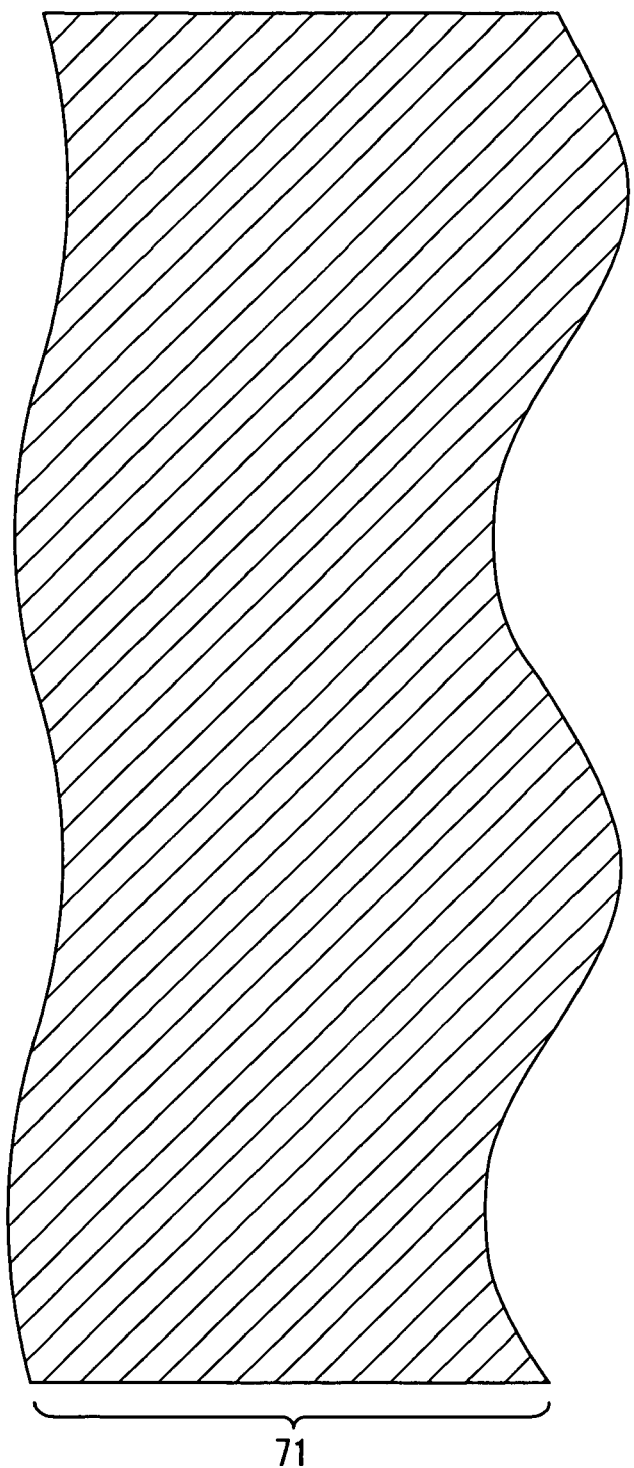
FIG. 5 shows a schematic structure of the wobbling grooves obtained by the exposure method shown in FIG. 4.

FIG. 4 schematically shows an exposure method for forming the wobbles having different amplitudes on both sides of the wobbling grooves 71 in phase, as described above. FIG. 5 schematically shows the wobbling grooves 71.

A D/A converter provided with an external reference voltage and capable of obtaining the output in proportion to the external voltage is prepared. The clockpulse double the frequency of 5 MHz is applied and the level data equivalent to 100% output and 50% output, respectively is repeatedly applied. The external reference voltage is voltage in which offset equivalent to 50% of reference voltage Vs is applied to the low-frequency wobble signal. For example, the external reference voltage Vo is Vo=Vs×0.5 (direct current)+low-frequency wobble signal (10% pp). If necessary, DC offset is applied to the output signal to eliminate the direct current component.

The envelope of the positive side of the high-frequency signal waveform (this defines the right side in FIG. 4) is 10% pp, whereas the envelope of the negative side (this defines the left side in FIG. 4) is 5% pp. This enable to obtain the control signal whose ratio of the amplitude of the envelope waveform of the positive side and the negative side of the high-frequency signal waveform is 2:1. However, the ratio of the amplitude of the envelope waveform is not limited to the above.

Variation of the ratio of the level data applied to the D/A converter can vary the modulation degree of the envelope waveform. Making one of the level data a negative voltage reverses the phase of the negative side and the positive side, thereby enabling the wobbles on both sides of the wobbling grooves 71 become mutually the opposite phase. It is possible to vary the amplitude of the high-frequency signal by changing the direct current offset voltage applied as the external reference voltage.

The control signal generated as described above is applied to the drive circuit 50 as a signal corresponding to the exposure pattern from the voltage frequency controller 51 during the exposure of the photoresist 12. Based on the signal, the drive circuit 50 drives the AOD 48, optical polarization is performed on the laser beam 30 for exposing the photoresist 12, and the planar pattern of the wobbling grooves 71 wobbling both sides thereof in phase in different amplitudes can be exposed on the photoresist 12 of the master.

Specifically, when storing the address information by wobbling the wobbling grooves 71 with a frequency of 84.672 kHz, the low-frequency signal and the high-frequency signal, which are FM modulated into 84.672 kHz and 5 MHz, respectively by use of a high-frequency signal having a center frequency of 224 MHz, are superimposed to generate the control signal. The obtained control signal is applied to the drive circuit 50 from the voltage frequency controller 51. Based on the applied signal, the drive circuit 50 changes the Bragg angle of the acoustic optical device 46 of the AOD 48, the polarization is performed acoustic optically on the laser beam 30, and the pattern wobbled both sides in phase in different amplitudes can be exposed.

The laser beam 30 applied the acoustic optical polarization by the AOD 48 is adjusted to a predetermined beam spot diameter by the beam magnifying lens 55, reflected by the mirror 22 and conducted to the objective lens 54. After that, the laser beam 30 is irradiated on the photoresist 12 on the master by the objective lens 54 while waving in the direction intersect with the groove direction of the wobbling grooves 71 as shown in FIG. 4. Thereby, the latent image including the pattern which wobbles both sides of a wobbling grooves 71 in phase in different amplitudes is formed on the photoresist 12. The planer pattern of the wobbling grooves 71 wobbles both sides thereof in different amplitudes is exposed by periodically waving one beam spot with different amplitudes based on the control signal superimposing the low-frequency signal and the high-frequency signal. As a result, no phase lag (or synchronous lag) is generated on both sides of the wobbles unlike the case where the wobbles on both sides of a wobbling groove 71 is exposed by using the different beam spots. This ensures the exposure of the wobbles on both sides in phase.

It is preferable for the objective lens 54 to have a larger NA (numerical aperture) in order to form the smaller loop pattern with a high accuracy. Specifically, the objective lens 54 with an NA of 0.9 or more is preferable.

After forming the latent image on the photoresist 12 on the master, the master is developed by dissolving exposed part of the photoresist 12. In particular, an undeveloped master is set on the turntable of processor, which is not shown. Then it is rotated with the turntable and developer is dropped on the surface of the master to develop the photoresist 12.

Subsequently, a conductive film of nickel (Ni) thin film is formed on the uneven pattern of the photoresist 12 on the master by electroless plating machine (not shown). The master formed with the conductive film is set on the gilding machine, which is not shown, and a nickel-plating layer with a thickness of about 300±5 $\mu$m is formed on the conductive film by electroplating, for example.

Then, the nickel-plating layer is separated from the master by cutter, squeegee for separation or the like and the photoresist 12 remaining on the surface in which the nickel-plating layer was formed is cleaned using acetone or the like to obtain stamper incorporated in a mold for an injection molding.

Using the stamper, the minute concavity and convexity in the wobbling grooves 71 and so on formed on the surface of the master are transferred on a surface of a base plate 1 by photopolymerization process (the so-called 2P process). For example, first, photopolymer is evenly applied on the surface formed with the concavity and convexity of the master to form a photopolymer layer 7. On the photopolymer layer 7, the base plate 1 of glass with a thickness of 1.2 mm and a refractive index of 1.52 or less is adhered while avoiding the mix of air bubble, dust and the like. Then, the photopolymer layer 7 is hardened by ultraviolet irradiation, and is separated form the master together with the base plate 1. Thereby, the disc substrate 2 on which the minute concavity and convexity of the surface of the master is transferred on the photopolymer layer 7 can be obtained.

A first dielectric film made of silicon nitride ($Si_3N_4$), a DWDD (Domain Wall Displacement Detection) film made of a TbFeCo alloy, a DyFeCo alloy, a GdFe alloy or the like, a second dielectric film made of silicon nitride and a reflective film made of an aluminum alloy (Al—Ti) are deposited in this order on the recording surface of the disc substrate 2 as shown in FIG. 1 as the recording area 3. After that, on the reflective film, 2P resin is smoothly applied to cover almost whole surface (top surface) of the substrate by, for example, spin coat method and hardened by irradiating UV lamp to form the protective layer 4. Thereby, the magneto optical disc of the embodiment is achieved.

In the embodiment, as a method that the concavity and convexity pattern of the wobbling grooves 71 or the like formed on the master is precisely transferred on the disc substrate 2, a method using photopolymer is described. However, in case of mass production with high efficiency of the disc substrate 2, a transparent resin such as polymethylmethacrylate and polycarbonate may be formed with injection molding to manufacture the disc substrate 2 formed with the concavity and convexity pattern of the wobbling grooves 71 thereon.

The materials for forming the base plate 1, the recording area 3, the protective layer 4 or the like of the magneto optical disc is not limited to the materials described above, so other materials can be used.

EXAMPLE

A plural evaluation magneto optical discs having the various amplitude of the wobbling grooves or the like were fabricated by the method using the master as described and the recording/reproducing capability were evaluated on each evaluation magneto optical disc.

In order to conduct an evaluation experiment of the evaluation magneto optical discs, first, the masters were fabricated. In the manufacturing process of the masters, the power of the laser beam 30 for exposure was varied to check the change in the groove width per power. Specifically, the power of the laser beam 30 was set to 0.9, 1.1 and 1.45 and the widths of the wobbling grooves 71 of the masters were measured on each case by use of an electron microscope. The groove widths were 562 nm, 622 nm and 682 nm in accordance with the above powers, respectively. Each amplitudes of one side of the disc was ±15 nm, and the other sides were set to have different amplitudes of ±0.5 nm, ±1.5 nm, ±3.0 nm and ±6.0 nm, respectively.

Using the masters fabricated as described above, the disc substrate 2 was formed by the above-described photopolymer process and the recording area 3 and the protective layer 4 were formed on the surface thereon to fabricate the evaluation magneto optical discs.

The reproducing characteristics of the wobble signal and the recording/reproducing characteristics of the magnetooptical recording layer were measured on each evaluation magneto optical discs fabricated as described above. The optical pickup in which a wavelength $\lambda$ of laser light is 650 nm and NA of the objective lens 54 is 0.52 was used for the measurement and the reading and reproducing were performed on the wobbling grooves 71 and the lands 72 with 1–7 modulation.

The results showed the stable reproduction of the wobble address signal in all evaluation magneto optical discs.

Further, the jitter as a typical value (parameter) of the recording/reproducing characteristics in the magnetooptical recording layer was measured on the evaluation magneto optical disc in which the amplitude of one side of the wobbling grooves 71 was ±15 nm and the other side thereof was ±6.0 nm. The results are shown in FIG. 6. Namely, when the groove width was 562 nm, the jitter in the lands 72 was 10.5% and the jitter in the wobbling grooves 71 was 9.5%. Further, when the groove width was 622 nm, the jitter in the lands 72 was 9.5% and the jitter in the wobbling grooves 71 was 8.5%. Furthermore, when the groove width was 682 nm, the jitter in the lands 72 was 10.0% and the jitter in the wobbling grooves 71 was 8.5%. The recording/reproducing characteristics of all evaluation magneto optical discs were stable enough. In the case where the amplitude of the other side of the wobbling grooves 71 is less than ±6.0 nm, it is assumed that further stable recording/reproducing characteristics can be obtained theoretically. In fact, it was confirmed that the recording/reproducing characteristics measuring the jitter as a typical value was more stable.

In all evaluation magneto optical discs in which the amplitude of one side of the wobbling grooves 71 was ±15 nm and the other side thereof were within the range between 0.5 nm at the minimum and 6.0 nm at the maximum, the stable recording/reproducing characteristics was obtained. It revealed that setting the ratio of amplitude of one side of the wobbling grooves 71 having a smaller amplitude to the other side thereof having a larger amplitude within the range from 3.3% to 40% enabled to obtain the stable recording/reproducing characteristics.

The invention is wildly applicable to an optical recording medium capable of forming different amplitudes of the wobble in both sides of the grooves, a master and a manufacturing method thereof and an optical recording apparatus.

The invention is also applicable to a rewritable optical recording medium capable of rewriting data more than once, a recordable optical recording medium capable of recording and incapable of deleting and a read-only optical recording medium in which data incapable of rewriting is prerecorded.

In addition, the invention is applicable to any recording type of data such as a read-only type, a magnetooptical type recording/reproducing data utilizing the magnetooptical effect and a phase-change type recoding/reproducing data using the phase change of the recording layer.

Furthermore, the invention is applicable to the optical recording medium in which the data recording area is formed only in the lands, only in the grooves, or both the lands and the grooves as well as the optical recording medium in which the embossed pits and the wobbling grooves are formed together in one disc.

As described, the optical recording medium, the optical recording medium master, manufacturing apparatus of the optical recording medium master and the optical recording/reproducing apparatus of the invention, the grooves are the wobbling grooves provided to wobble both sides of the grooves in different amplitudes. Further, both sides of the grooves are wobbled in phase in the track direction. As a result, even if the track pitch is narrowed to improve the recording density, the effect such that the stable wobble signal is reproduced without generating beats are achieved.

Obviously many modifications and variations of the present invention are possible in the light of the above teachings. It is therefore to be understood that within the scope of the appended claims, the invention may be practiced otherwise than as specifically described.

What is claimed is:

1. An optical recording medium in which grooves are formed on a surface of a substrate to constitute a groove track and information can be read along a track of the grooves, wherein the grooves are wobbling grooves provided to wobble both sides of the grooves in different amplitudes, and the wobbling grooves have a ratio of amplitude of one side of the wobbling grooves having a smaller amplitude to the other side thereof having a larger amplitude within the range from 3.3% to 40%.

2. An optical recording medium according to claim 1, wherein information can be recorded on grooves of the wobbling grooves and on lands between the adjacent wobbling grooves.

3. An optical recording medium in which grooves are formed on a surface of a substrate to constitute a groove track and information can be read along a track of the grooves, wherein the grooves are wobbling grooves provided to wobble both sides of the grooves in phase in different amplitudes, and the wobbling grooves have a ratio of amplitude of one side of the wobbling grooves having a smaller amplitude to the other side thereof having a larger amplitude within the range from 3.3% to 40%.

4. An optical recording medium according to claim 3, wherein information can be recorded on grooves of the wobbling grooves and on lands between the adjacent wobbling grooves.

5. An optical recording medium master used for manufacturing an optical recording medium in which grooves are formed on a surface of a substrate to constitute a groove track and information can be read along a track of the grooves, wherein the grooves are wobbling grooves provided to wobble both sides of the grooves in different amplitudes, and the wobbling grooves have a ratio of amplitude of one side of the wobbling grooves having a smaller amplitude to the other side thereof having a larger amplitude within the range from 3.3% to 40%.

6. An optical recording medium master according to claim 5, wherein an optical recording medium in which information can be recorded on grooves of the wobbling grooves and on lands between the adjacent wobbling grooves is manufactured.

7. An optical recording medium master in which grooves are formed on a surface of a substrate to constitute a groove track and information can be read along a track of the grooves, wherein the grooves are wobbling grooves provided to wobble both sides of the grooves in phase in different amplitudes, and the wobbling grooves have a ratio of amplitude of one side of the wobbling grooves having a smaller amplitude to the other side thereof having a larger amplitude within the range from 3.3% to 40%.

8. An optical recording medium master according to claim 7, wherein an optical recording medium in which information can be recorded on grooves of the wobbling grooves and on lands between the adjacent wobbling grooves is manufactured.

9. A manufacturing apparatus for an optical recording medium master patterning grooves forming a track on a surface of a master, wherein a light beam for exposure or a laser beam is relatively traveled on a surface of a master of an optical recording medium with waving at a certain period in a direction intersect with a traveling based on a control signal superimposing a low-frequency signal and a high-frequency signal, and a latent image is formed to become wobbling grooves wobbles both sides of the grooves in phase in different amplitudes, wherein the wobbling grooves have a ratio of amplitude of one side of the wobbling grooves having a smaller amplitude to the other side thereof having a larger amplitude within the range from 3.3% to 40%.

10. A manufacturing apparatus for an optical recording medium master according to claim 9, wherein wobbles on both the sides are kept in phase and amplitudes of the wobbles on both the sides are independently controlled.

11. An optical recording/reproducing apparatus recording/reproducing information on/from an optical recording medium having wobbling grooves provided to wobble both sides of grooves in different amplitudes and recording information both on the wobbling grooves and on lands, comprising:
   a means for traveling a light spot on the wobbling grooves; and
   a means for detecting a wobble signal by traveling the light spot on the wobbling grooves, wherein
   the wobbling grooves have a ratio of amplitude of one side of the wobbling grooves having a smaller amplitude to the other side thereof having a larger amplitude within the range from 3.3% to 40%.

12. An optical recording/reproducing apparatus recording/reproducing information on/from an optical recording medium having wobbling grooves provided to wobble both sides of grooves in different amplitudes and recording information either on the wobbling grooves or on lands, comprising:
   a means for traveling a light spot on the wobbling grooves; and
   a means for detecting a wobble signal by traveling the light spot on the wobbling grooves, wherein
   the wobbling grooves have a ratio of amplitude of one side of the wobbling grooves having a smaller amplitude to the other side thereof having a larger amplitude within the range from 3.3% to 40%.

* * * * *